United States Patent
Carlson et al.

(10) Patent No.: US 9,522,834 B2
(45) Date of Patent: Dec. 20, 2016

(54) PROCESS FOR REMOVING SALTS FROM A PROCESSING LIQUID

(71) Applicants: Stephen W. Carlson, Cypress, TX (US); Raymond G. F. Abry, Calgary (CA)

(72) Inventors: Stephen W. Carlson, Cypress, TX (US); Raymond G. F. Abry, Calgary (CA)

(73) Assignee: CCR Technologies, Ltd., Calgary (CA)

(*) Notice: Subject to any disclaimer, the term of this patent is extended or adjusted under 35 U.S.C. 154(b) by 44 days.

(21) Appl. No.: 14/379,345

(22) PCT Filed: Feb. 19, 2013

(86) PCT No.: PCT/US2013/026729
§ 371 (c)(1),
(2) Date: Aug. 18, 2014

(87) PCT Pub. No.: WO2013/126346
PCT Pub. Date: Aug. 29, 2013

(65) Prior Publication Data
US 2015/0034567 A1 Feb. 5, 2015

Related U.S. Application Data

(60) Provisional application No. 61/600,854, filed on Feb. 20, 2012.

(51) Int. Cl.
*B01D 19/00* (2006.01)
*B01D 53/14* (2006.01)
*C02F 1/20* (2006.01)
*C02F 1/70* (2006.01)
(Continued)

(52) U.S. Cl.
CPC ............ *C02F 9/00* (2013.01); *B01D 19/0005* (2013.01); *B01D 19/0036* (2013.01); *B01D 53/1425* (2013.01); *C02F 1/20* (2013.01); *C02F 1/70* (2013.01); *B01D 53/1462* (2013.01); *B01D 53/1468* (2013.01); *B01D 53/1475* (2013.01); *C02F 2101/10* (2013.01)

(58) Field of Classification Search
CPC .............. C02F 1/20; C02F 1/667; C02F 9/00; C02F 2101/10; C02F 1/66; C02F 1/70; B01D 19/0036; B01D 19/0005; B01D 53/14; B01D 53/1425; B01D 53/1456; B01D 53/1462; B01D 53/1468; B01D 53/1475; B01D 53/1487; B01D 2252/202; B01D 2252/2021; B01D 2252/2023; B01D 2252/20478
See application file for complete search history.

(56) References Cited

U.S. PATENT DOCUMENTS

| 3,119,752 A | 1/1964 | Checkovich |
| 4,417,961 A | 11/1983 | Ezzell et al. |
| 2009/0032446 A1 | 2/2009 | Wiemers et al. |

FOREIGN PATENT DOCUMENTS

| CA | 2564590 | 4/2004 |
| EP | 0077492 | 4/1983 |
| EP | 2439176 | 4/2012 |

(Continued)

*Primary Examiner* — Lucas Stelling
(74) *Attorney, Agent, or Firm* — Bushman Werner, P.C.

(57) ABSTRACT

A process for removing acid decomposable contaminants from a processing liquid wherein an acid is admixed with a processing liquid and the mixture of acid and processing liquid are introduced into a degassing vessel such that the gas formed by the reaction of the acids and the decomposable gases is released and a processing liquid freed of acid decomposable contaminants is removed from the degassing vessel.

6 Claims, 1 Drawing Sheet

(51) Int. Cl.
    *C02F 9/00*     (2006.01)
    *C02F 101/10*     (2006.01)

(56) References Cited

FOREIGN PATENT DOCUMENTS

| WO | WO2007/073204 | 6/2007 |
|----|---------------|--------|
| WO | WO2010/061811 | 6/2010 |

PROCESS FOR REMOVING SALTS FROM A PROCESSING LIQUID

CROSS REFERENCE TO RELATED APPLICATION

This application is a U.S. national phase of PCT/US2013/026729, filed Feb. 19, 2013, which claims priority to U.S. Application No. 61/600,854 filed on Feb. 20, 2012 the disclosures of which are incorporated herein by reference for all purposes.

FIELD OF THE INVENTION

The present invention relates to recovering processing liquids used in certain applications. More particularly, the present invention relates to the removal of certain acid decomposable salts prior to reclamation of the processing liquid for reuse.

BACKGROUND OF THE INVENTION

In U.S. Pat. Nos. 5,152,887, 5,158,649, 5,389,208, 5,441,605, 5,993,608, and 6,508,916 there are disclosed reclaiming processes for recovering process liquids such as, for example, recovering a processing liquid from a mixture comprising water, a processing liquid having a higher boiling point than water, optionally at least one additional component that is more volatile than the processing liquid and water, and at least one component that is less volatile than, and can be dissolved or suspended in the processing liquid.

In the processes disclosed in the aforementioned patents, the presence of undissolved salts (contaminates) complicates the process and makes it necessary to separate the salts in the process. With particularly reference to U.S. Pat. Nos. 5,993,608 and 6,508,916, both which are incorporated herein by reference for all purposes, there is disclosed a method wherein less volatile components, e.g., salts, which are either dissolved and/or suspended can be removed from the processing liquids under conditions that prevent any substantial degradation of the processing liquid. However, it would still be desirable if at least some of the salts could be removed prior to the processing liquid being subjected to the reclaiming process per se. Carbonate and bicarbonate salts dissolved in the processing liquids can build up during the reclaiming process leading to undesirable effects. It would clearly be desirable if these salts or other acid decomposable salts could be removed prior to the spent processing liquid entering the reclaiming system.

In one particular aspect of the processes described in the aforementioned patents, certain processing liquids such as alcohols, glycols, alkanolamines and other such materials can be used to prevent gas hydrate formation and/or remove acidic gases in oil and gas production, particularly on offshore platforms.

Hydrate control is critical to oil and gas production to prevent blockage of production tubing, valves and other equipment with clathrates. Hydrate inhibitors may include, but are not limited to, thermodynamic hydrate inhibitors such as alcohols (e.g. methanol) and glycols (e.g. monoethylene glycol), kinetic hydrate inhibitors (e.g. polyvinylcaprolactam, polymers, co-polymers or blends thereof) and anti-agglomerate hydrate inhibitors (e.g. N-butyl-N(3-(co-camino)-3-oxopropyl)butan-1-aminium acetate) are injected at or near the production manifold and flow back with the formation water, water of condensation and hydrocarbon phases being produced from the reservoir(s) of interest. In such a process, monoethylene glycol, for example, can become contaminated, with, but not limited to, water of condensation, formation water, salts contained in the formation water, flow assurance loop corrosion inhibitors, flow assurance loop corrosion products such as mill scale and iron sulphide. Certain contaminants/salts render the hydrate control ability of the selected hydrate inhibitor unusable for reinjection, thus requiring the contaminants to be removed prior to injection. The teachings in U.S. Pat. Nos. 5,993,608 and 6,508,916 provide methods and apparatus to carry out such contaminant removal from such a spent processing liquid.

In the case where the formation water contains salts of carbonates and/or bicarbonates and again with particular reference to oil and gas production and especially the prevention of gas hydrates, the carbonate and/or bicarbonate salts can range from relatively low levels in the spent processing liquid to concentrations beyond saturation levels, leading to the potential for formation of crystalline (precipitated) salts. During the processes disclosed in the aforementioned patents these salts are purposefully concentrated beyond saturation levels leading to the formation of crystalline (precipitated) salts. However, if these precipitated salts occur in spent processing liquid upstream of any solvent/reclaiming recovery process, be it regeneration where water is selectively removed, reclamation where salts are removed or a combination of thereof, the presence of these precipitated solids can lead to increased fouling of equipment and more complicated separation of the valuable processing liquid from these salts.

A further complication that acid soluble salts can induce is an uncontrolled increase in pH of the processing liquid over time. Testing has shown that bicarbonate can dissociate under temperature to carbonate and carbon dioxide. As the carbonate content of the process liquid increases, so does the pH. This may be beneficial for a period of time but if left unchecked extremely high pH values, in the neighbourhood of 12 can be achieved and for glycol based inhibitors it is possible to induce unwanted gelation. By removing the bicarbonates/carbonates, control on pH levels can be regained and maintained through selective addition

SUMMARY OF THE INVENTION

Accordingly and in accordance with an aspect of the present invention, herein is provided a process for pretreating a processing liquid to be reclaimed to remove acid decomposable salts and thereby prevent the buildup of crystalline or undissolved versions of such salts in the reclaiming process. As one example, if the spent processing solution contains carbonate and/or bicarbonate, it can be treated with an acid such as, but not limited to, hydrochloric acid to decompose the carbonate to $CO_2$, water and sodium chloride.

DETAILED DESCRIPTION OF PREFERRED EMBODIMENTS

As used herein, the term acid decomposable salts refers to carbonates and/or bicarbonates of alkali and alkaline earth metals such as sodium carbonate, sodium bicarbonate, potassium carbonate, potassium bicarbonate, magnesium carbonate, etc. It is to be understood however that the process of the present invention is applicable to any acid decomposable salts whether or not it is a carbonate or bicarbonate of an alkali and/or alkaline earth metal, the presence of which can deleteriously affect the downstream reclamation process of the processing liquid.

While the invention will be described with particular reference to a process liquid used to prevent gas hydrate formation in oil and gas well operations, it is to be understood that it is not so limited. Indeed, the process can be used in any scheme to reclaim a spent processing fluid so it can be reused wherein the spent processing fluid contains acid decomposable salts.

It will be recognized that numerous acids can be employed, the proviso being that the acid does not react with the acid decomposable salt to form other insoluble or slightly soluble salts which would again build up in the process during the reclaiming of the processing liquid. Non-limiting examples of acids include hydrochloric acid, certain organic acids, etc.

Figure 1:
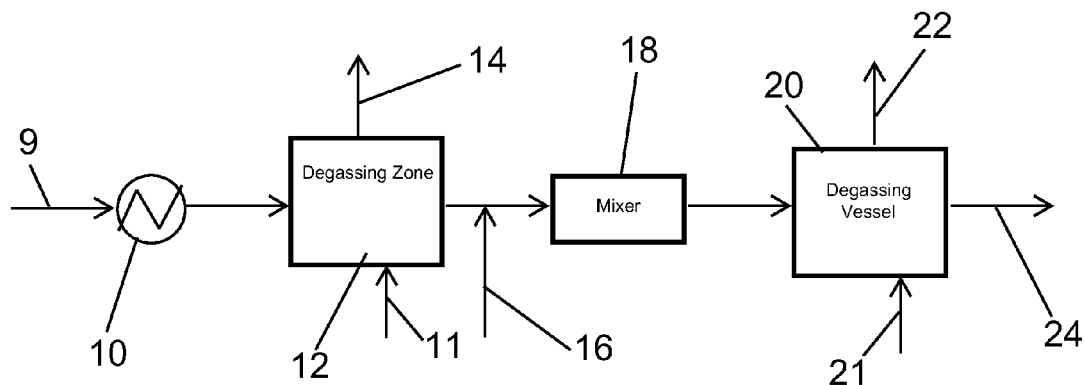
FIG. 1 is a schematic flow diagram of one method of removing acid decomposable salts from a process liquid which is to be subjected to further reclamation.

Referring thus to FIG. 1, a processing liquid is introduced via line 9 into a heat exchanger 10, wherein it is heated to the desired temperature depending on the nature of the processing liquid, and then passed to a degassing vessel 12 operated at a reduced pressure which in effect causes the entrained acid gases, such as $CO_2$ and $H_2S$, as well as volatile hydrocarbons and other volatile gases to be released from the liquid via line 14. If desired, a sweep gas, e.g., nitrogen, fuel gas, or any gas which does not deleteriously react with any component in the processing liquid, can be introduced into degassing vessel 12 via line 11 to help flush the entrained gases as well as volatile hydrocarbons from vessel 12. Generally, when a sweep gas is used, it will be introduced at a rate of from about 8 to 12 kg/h.

The proviso is that the contents of line 14 must be maintained in an oxygen free state. If sufficient pressure drop between the heat exchanger 10 and line 14 end point exists to properly remove the desired level of vessel 12, then addition of the sweep gas is not required. The degassed liquid leaving the degassing vessel 12 is then mixed with acid via line 16, the mixture passing through an inline mixer 18 or other mixing device and introduced into degassing vessel 20 where decomposition gases, e.g., $CO_2$ from the decomposed salts are removed via line 22. Removal of the $CO_2$ from vessel 20 can be facilitated by addition of one of the sweep gases mentioned previously through line 21 at up to a maximum of 10 kg/h to the lower portion of the degassing vessel 20. If sufficient pressure drop between the mixer 18 and line 22 end point exists to properly remove all $CO_2$ from the process liquid leaving through line 22, then addition of the sweep gas is not required. The processing liquid from degassing vessel 20, freed of carbonate and/or bicarbonate, is then passed downstream via line 24 to a process for reclaiming the processing liquids. As in the case of degassing vessel 12, degassing vessel 20 will preferably operate at a reduced pressure to facilitate removal of the $CO_2$ gases from the liquid. Gases such as $CO_2$ vented from either degassing vessel 12 or degassing vessel 20 can be collected through a variety of means well known to those skilled in the art. For example, the $CO_2$ can be sent to a low pressure flare header, a $CO_2$ injection facility, to atmosphere for venting, supplemental compression, sequestration, etc.

Figure 2:
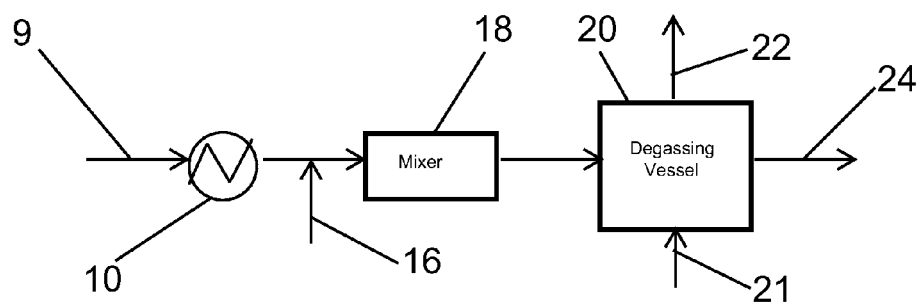
FIG. 2 is a schematic view similar to FIG. 1 but showing another aspect of the present invention.

Referring next to FIG. 2, there is shown a variation of the process of FIG. 1. In the process depicted in FIG. 2, the processing liquid is passed through heat exchanger 10 to be heated, acid is added via line 16, and the mixture passed through inline mixer 18 to degassing vessel 20 where $CO_2$ is released via line 22, the degassing vessel preferably being under reduced pressure, the processing liquid freed of carbonates/bicarbonates being removed for further processing via line 24. As can be seen the process in FIG. 2 differs from that in FIG. 1 in that the heating step and the acid addition step can be combined prior to the stream entering any of the degassing vessels. Provision to assist in removal of the $CO_2$ from vessel 20 can be facilitated as with FIG. 1 by addition of one of the two sweep gases mentioned previously through line 21 at up to a maximum of about 10 kg/h. If sufficient pressure drop between the mixer 18 and line 22 end point exists to properly remove all $CO_2$ from the process liquid leaving through line 24, then addition of the sweep gas is not required.

Figure 3:
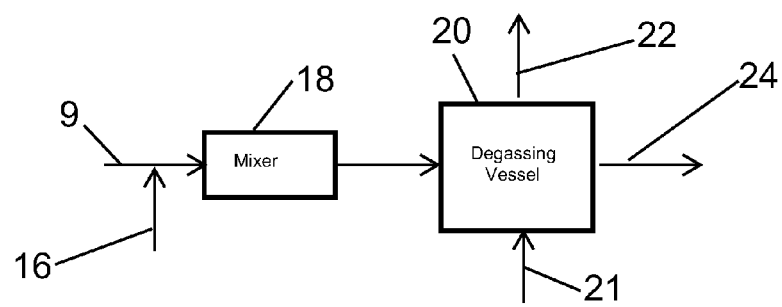
FIG. 3 is a schematic view similar to FIGS. 1 and 2 but showing yet another aspect of the present invention.

In yet another variation of the process, shown in FIG. 3, the heating step may be omitted. In this case, acid is added to the spent processing liquid via line 16, the mixture passing through mixer 18 and into degassing vessel 20 operated preferably at a lower pressure, e.g., under vacuum, the $CO_2$ being removed from the degassing vessel via line 22, processing liquid freed of carbonate/bicarbonate being removed for further processing via line 24. Sweep gas via line 21, as described previously, can be applied to this configuration as process conditions require.

It will be appreciated, as noted above, that any type of acid can be used to effect the removal of carbonates and/or bicarbonates from the process liquid. Once again the acid employed should not react with the carbonate/bicarbonate to form water insoluble or slightly soluble salts or other solids which would simply pose another solids removal problem downstream. It will also be appreciated that acid decomposable salts other than carbonates and/or bicarbonates are contemplated provided that the acid decomposition does not result in the formation of aqueous insoluble to slightly soluble salts which could again pose a solids buildup problem in the downstream process.

The salt removal process of the present invention finds particular application in combination with the processes described in the aforementioned patents for reclaiming a spent processing liquid. Thus, the processing liquid can be any liquid that is used in a particular process such that it becomes contaminated with, or at least after use contains, components not normally present in the processing liquid. Accordingly, the processing liquid can be one from a gas scrubbing medium used to remove undesirable contaminants from gas streams, a selective solvent to recover desirable components from gases or liquid streams, a medium used to treat solids to selectively remove components of the solids, etc. As also noted above, the processing liquid can also be one used in the recovery of natural gas wherein the processing liquid is used to prevent the formation of gas hydrates.

What is claimed is:

1. A process for removing acid decomposable salts from a processing liquid, said process comprising:
   introducing a processing liquid selected from the group consisting of alcohols, glycols, and alkanolamines, said processing liquid containing acid decomposable salts into a first degassing vessel operated under vacuum conditions to remove entrained acid gases from said processing liquid;

removing processing liquid from said first degassing vessel;

mixing said processing liquid removed from said first degassing vessel with acid; and introducing said mixture into a second degassing vessel wherein decomposition gases formed by the reaction of said acids and said acid decomposable salts are released; and removing said decomposition gases from said second degassing vessel; and removing processing liquid from said second degassing vessel substantially free of said acid decomposable salts.

2. The process of claim 1, wherein said mixture is passed through an inline mixer prior to being introduced into said second degassing vessel.

3. The process of claim 1, wherein a sweep gas is introduced into said second degassing vessel to sweep decomposition gases from said second degassing vessel.

4. The process of claim 1, wherein said second degassing vessel is operated under vacuum.

5. The process of claim 1, wherein said processing liquid is heated prior to admixture with said acid.

6. The process of claim 1 wherein a sweep gas is introduced into said first degassing vessel to help remove entrained gases from said first degassing vessel.

* * * * *